(12) United States Patent
Rail (10) Patent No.: US 7,590,631 B2
(45) Date of Patent: Sep. 15, 2009

(54) SYSTEM AND METHOD FOR GUIDING NAVIGATION THROUGH A HYPERTEXT SYSTEM

(75) Inventor: Peter D. Rail, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 10/932,941

(22) Filed: Sep. 2, 2004

(65) Prior Publication Data
US 2006/0047663 A1   Mar. 2, 2006

(51) Int. Cl.
G06F 17/30   (2006.01)

(52) U.S. Cl. .............................. 707/10; 707/6; 707/100; 707/201; 707/5

(58) Field of Classification Search ................. 707/10
See application file for complete search history.

(56) References Cited

U.S. PATENT DOCUMENTS

| | | | |
|---|---|---|---|
| 6,085,226 A * | 7/2000 | Horvitz ..................... 709/203 |
| 6,182,133 B1 * | 1/2001 | Horvitz ..................... 709/223 |
| 6,223,188 B1 * | 4/2001 | Albers et al. ............ 715/501.1 |
| 6,405,192 B1 * | 6/2002 | Brown et al. .................. 707/3 |
| 7,073,121 B2 * | 7/2006 | Brown et al. ................ 715/513 |
| 7,167,875 B2 * | 1/2007 | Brown et al. ............. 707/104.1 |
| 2002/0165925 A1 * | 11/2002 | Hamilton et al. ............ 709/213 |
| 2004/0012625 A1 * | 1/2004 | Lei et al. .................... 345/738 |
| 2005/0021862 A1 * | 1/2005 | Schroeder et al. ........... 709/246 |
| 2006/0235983 A1 * | 10/2006 | Layman et al. ............. 709/227 |

OTHER PUBLICATIONS

Pazzani, M., et al., "Syskill & Webert: Identifying Interesting Web Sites," Proceedings of the National Conferal Intelligence and Innovative Applications of Artificial Intelligence Conference, vol. 1, Aug. 4, 1996, pp. 54-61.

Armstrong, R, et al.; "WebWatcher: A Learning Apprentice for the World Wide Web," Conference Proceedings: AAAI Spring Symposium on Information Gathering, Feb. 1, 1995, online at www.cs.cornell.edu/People/tj/publications/armstrong_etal_95a.ps.gz.

* cited by examiner

*Primary Examiner*—Wilson Lee
*Assistant Examiner*—Binh V Ho (57) ABSTRACT

A method, system, and computer program product for aiding a user in navigating documents containing hyperlinks is provided. In one embodiment, the system retrieves, in response to a user request, a document from a network location. The system parses the document for hyperlinks and responsive to detecting a hyperlink, sends a request for at least a portion of the secondary document associated with the hyperlinks to a server. The portion contains information sufficient to determine relevance of the secondary document to the user. The system then receives the information from the server and compares the information within the portion of the secondary document to reader preferences. Based on the results of the comparison of the information with the reader preferences, the system modifies the appearance of the hyperlink. If the system determines that the secondary document is highly relevant to the user, the system may also prefetch the secondary document and store it in a read ahead cache to speed up browsing for the user.

21 Claims, 6 Drawing Sheets

SYSTEM AND METHOD FOR GUIDING NAVIGATION THROUGH A HYPERTEXT SYSTEM

BACKGROUND OF THE INVENTION

1. Technical Field

The present invention relates to computer software and, more specifically to aids in navigating hypertext in a distributed computing environment.

2. Description of Related Art

The "Internet" is a worldwide network of computers. Today, the Internet is made up of more than 65 million computers in more than 100 countries covering commercial, academic and government endeavors. Originally developed for the U.S. military, the Internet became widely used for academic and commercial research. Users had access to unpublished data and journals on a huge variety of subjects. Today, the Internet has become commercialized into a worldwide information highway, providing information on every subject known to humankind.

The Internet's surge in growth in the latter half of the 1990s was twofold. As the major online services (AOL, CompuServe, etc.) connected to the Internet for e-mail exchange, the Internet began to function as a central gateway. A member of one service could finally send mail to a member of another. The Internet glued the world together for electronic mail, and today, the Internet mail protocol is the world standard.

Secondly, with the advent of graphics-based Web browsers such as Mosaic and Netscape Navigator, and soon after, Microsoft's Internet Explorer, the World Wide Web took off. The Web became easily available to users with PCs and Macs rather than only scientists and hackers at UNIX workstations. Delphi was the first proprietary online service to offer Web access, and all the rest followed. At the same time, new Internet service providers rose out of the woodwork to offer access to individuals and companies. As a result, the Web has grown exponentially providing an information exchange of unprecedented proportion. The Web has also become "the" storehouse for drivers, updates and demos that are downloaded via the browser.

Enterprise or company private intranets have also developed right along with the development of the Internet. These internal company intranets or networks often function much the same was the Internet does and provide employees with a mechanism for sharing information. However, one problem common to both the Internet and private intranet is the problem of efficiently locating relevant information from the mass of information available.

It is fairly common now for web sites to contain hyperlinks to other web sites enabling a user to navigate from one web site to the next using hyperlinks to take the user to information the user believes will be useful. For enterprises, there are benefits of relying on the enterprise's intranet to organize and deliver content to knowledge workers occasionally using hyperlinks to connect various documents. Clearly, it is cheaper and more easily updated than old-fashioned paper manuals. But departing from the linear structure of paper documents has sometimes left readers confused and frustrated.

The many hyperlinks which branch from a web page may seem like a boon at first, but workers or other users soon realize that they can't quickly judge which hyperlinks to follow to retrieve reference material for their job role within an enterprise or to retrieve material of interest for the lay person browsing the Internet. Consequently, they waste time following links that do not help them. Therefore, it would be desirable to have a system, method, and computer program product that provided assistance to users in navigating an intranet or the Internet that would allow the user to more efficiently locate relevant documents.

SUMMARY OF THE INVENTION

The present invention provides a method, system, and computer program product for aiding a user in navigating documents containing hyperlinks. In one embodiment, the system retrieves, in response to a user request, a document from a network location. The system parses the document for hyperlinks and responsive to detecting a hyperlink, sends a request for at least a portion of the secondary document associated with the hyperlinks to a server. The portion contains information sufficient to determine relevance of the secondary document to the user. The system then receives the information from the server and compares the information within the portion of the secondary document to reader preferences. Based on the results of the comparison of the information with the reader preferences, the system modifies the appearance of the hyperlink. If the system determines that the secondary document is highly relevant to the user, the system may also prefetch the secondary document and store it in a read ahead cache to speed up browsing for the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
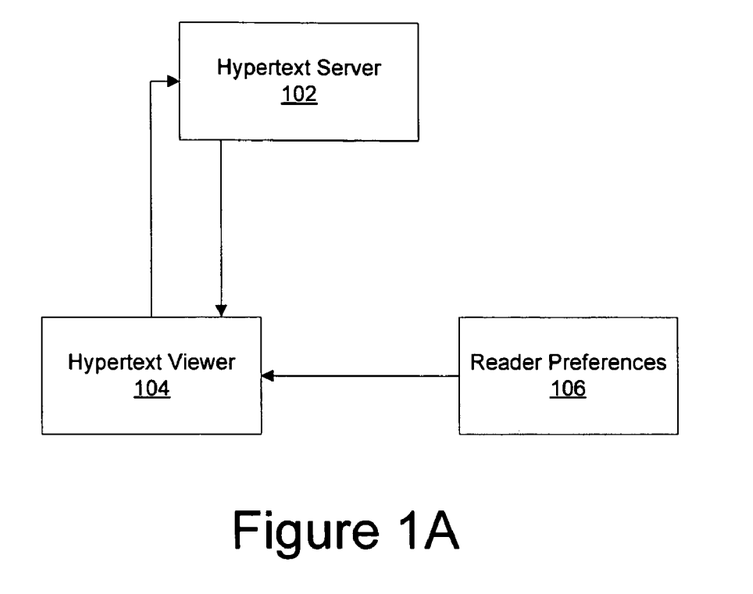
FIG. 1A depicts a block diagram illustrating an exemplary hypertext web browsing navigation system at a basic level in accordance with one embodiment of the present invention.

With reference now to the figures, and in particular with reference to FIG. 1A, a block diagram illustrating an exemplary hypertext web browsing navigation system is depicted at a basic level in accordance with one embodiment of the present invention. The hypertext web browsing navigation system of the present invention is sometimes referred to simply as "navigation assistant" for convenience. The hypertext web browsing navigation system, (i.e., navigation assistant), consists of a hypertext viewer 104, a hypertext server 102, and a cache 106. Hypertext (often also referred to as hyperlinks or links) is text within a document that has been formatted to contain such that selecting a hyperlink results in brining information about the hypertext to the attention of a user. The information may be a web page that is loaded into a web browser or other viewer or may be presented in another manner, such as, for example, by presenting information in a pop-up window. The information may be retrieved from an external site via a network, such as, for example, an internet or the Internet, or may be retrieved from another location within the local data processing system. However, for most purposes related to the present invention, the selection of the hyperlink will result in the loading of a new document retrieved from elsewhere within an internet or the Internet.

When a user retrieves a web page or other document containing hyperlinks from hypertext server 102 through hypertext viewer 104, the hypertext viewer sends a request back to the hypertext server requesting the hypertext server 102 to send the headers of the web pages associated with the links in the document originally received by the hypertext viewer 104. The header of a document associated with a hypertext may contain information identifying various characteristics associated with that document, such as, for example, a score indicating the relevance of the document for a particular audience, the type of content contained within the document, the language the document is written in, the title of the document, and the creator or author of the document. Preferably, only the header is retrieved in order to optimize performance since the header is obviously smaller than the entire document. Typically, this information will be contained in meta tags within the document. However, other methods of encoding the information may be utilized as well. To function properly, it is merely required that the hypertext viewer 104 be able to identify the encoding method and parse the document for the appropriate information.

Once the hypertext viewer 104 has received the document characteristics information, the hypertext viewer 104 consults reader preferences 106 to determine if any of the characteristics of any documents associated with the hypertext within the main document satisfy any of the criteria that the user has selected and stored in reader preferences 106. Hyperlinks having characteristics that satisfy reader preferences 106 will have their appearance modified or have some other indication inserted near them to indicate to a user that selection of these hyperlinks will more likely result in the acquisition of a document with information of interest to the user. Additionally, some documents associated with hyperlinks that have been determined to be of special relevance to the user may be prefetched and stored in a cache such that if the user selects the associated hyperlink, that document is made available to the user more quickly.

Examples of modifications to the appearance of the hypertext include displaying hypertext that matches criteria selected by reader preferences 106 in a different color from the hypertext that do not match reader preferences 106. The modification in the appearance may also include displaying the hypertext of matching hypertext and non-matching hypertext in different fonts, in different size fonts, one bold and one not, one underlined and one not, one italicized and one not. Other possible modifications to the hypertext may include displaying icons or other graphics over, next to, or near hypertext that matches criteria specified in reader preferences 106. Alternatively, the appearance of hypertext that does not match criteria specified by reader preferences 106 may be modified or have icons or other graphics presented near or over the hypertext. In other embodiments, the appearance of both the matching hypertext and the non-matching hypertext may be modified. In any case, the modifications to the hypertext within the original document is such that it is readily apparent to the user as to which hypertexts the system believes contain content that would be of interest or greater interest to the user.

In order for the system to function properly, the documents contained should be encoded, typically by the creator, with information indicating the type of content, etc., contained by the document. Users are also required to specify the criteria in reader preferences 106 that they are most interested in. Typically, to maintain the most privacy for the user, the reader preferences 106 are stored on the user's local data processing system. However, in some embodiments, the reader preferences 106 may be contained on a server, such as the hypertext server 102. In such embodiments, the appearance of the document and the hypertext may be performed by the hypertext server 102 prior to sending the document to the hypertext viewer 104.

Although it is preferable to only prefetch the portion, such as, for example, the header, of the documents associated with the hypertext in the main document in order to determine the relevance of the document, in some embodiments, the entire document associated with each hypertext may be prefetched, parsed, and compared to reader preferences 106 to determine the relevance of the document associated with a hyperlink to the interests of the user.

It is envisioned that the present invention will have the most applicability in the context of an enterprise's intranet where document creation formats complying with the requirements of the present invention may be enforced and users required to specify reader preferences 106. For example, in such an environment, an author may specify the intended audience by indicating relevant scores for various audiences, such as, management, administration, and technical indicating by, for example, a score of 1 to 5 for each with a score of 5 indicating that the document is highly relevant to this audience and a score of 1 indicating that the document is minimally relevant to this audience. The user may then indicate in the user's reader preferences 106 that hypertext linked to documents with a management audience score of 4 or greater should be displayed in a manner to indicate their relevance to the user.

In some embodiments, the manner in which hypertext is displayed to the user may be selected by the user. Furthermore, in some embodiments, the user may select gradations in display such that, for example, hypertext associated with highly relevant documents are displayed in one fashion, hypertext associated with less relevant documents are displayed in a different fashion, and hypertext associated with documents that are of little or no relevance to the user are displayed in yet another fashion.

If a hypertext corresponds to a document that does not contain information encoding consistent with that described by the present invention such that the hypertext viewer is unable to determine the relevance of the document associated with the hypertext, then that hypertext may be modified to indicate that no look ahead value or relevance value has been determined, or the hypertext may be displayed as the viewer 104 would normally display hypertext in the absence of the present invention.

Furthermore, in some embodiments, reader preferences 106 may be selected to indicate that the processes of the present invention should only be applied to documents originating from specified domains, thereby eliminating the waste of time that would be incurred in prefetching documents or documents headers from domains in which the user knows that it is unlikely that the documents have been formatted to contain information necessary to determine probably relevancy for the user.

Figure 1B:
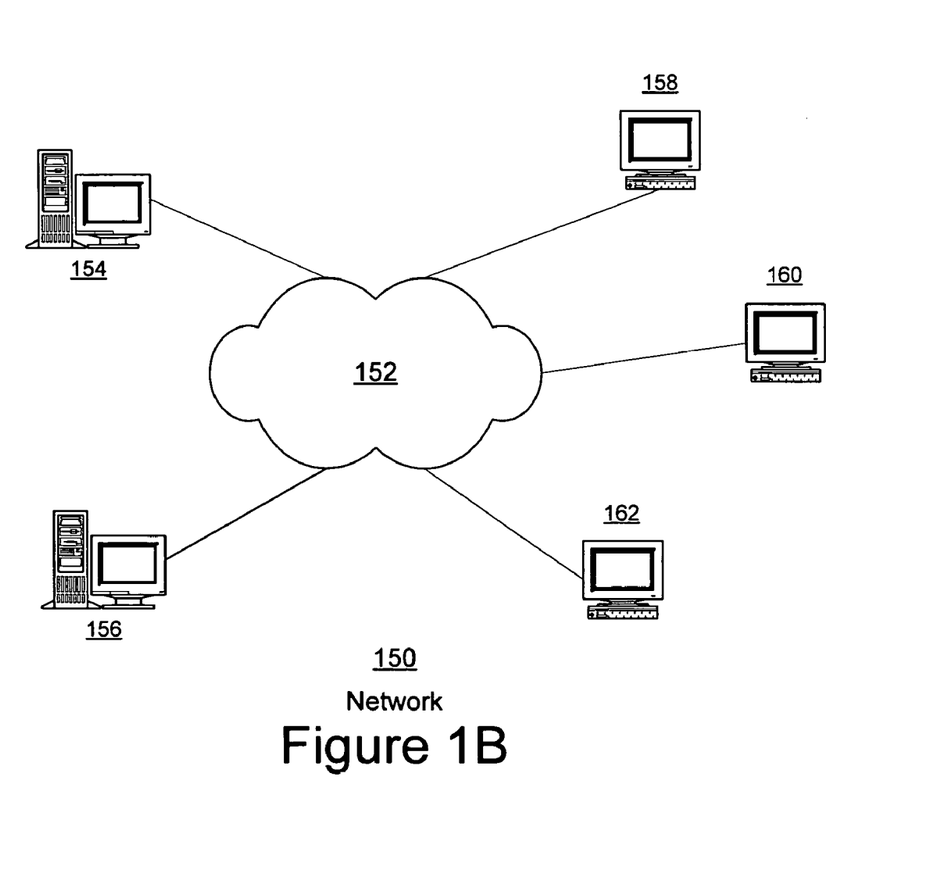
FIG. 1B depicts a pictorial representation of a distributed data processing system in which the present invention may be implemented.

With reference now to FIG. 1B, a pictorial representation of a distributed data processing system is depicted in which the present invention may be implemented.

Distributed data processing system 150 is a network of computers in which the present invention may be implemented. Distributed data processing system 150 contains network 152, which is the medium used to provide communications links between various devices and computers connected within distributed data processing system 150. Network 152 may include permanent connections, such as wire or fiber optic cables, or temporary connections made through telephone connections.

In the depicted example, servers 154 and 156 are connected to network 102. In addition, clients 158, 160 and 162 are also connected to network 152. These clients, 158, 160 and 162, may be, for example, personal computers or network computers. In the depicted example, server 154 may implemented as a hypertext server, such as, for example, hypertext server 102 depicted in FIG. 1A, delivering documents to clients 158-162. Clients 158, 160 and 162 are clients to server 154. Distributed data processing system 150 may include additional servers, clients, and other devices not shown.

Server 156 may be a server from which documents are retrieved. Server 154 receives requests from any one of clients 158-162 for content and retrieves the content, from, for example, server 156, and transmits the retrieved documents to the requesting one of clients 158-162. A requesting client 158-162 may then determine the document locations associated with the hypertext within the original requested document and send another request to server 154 to retrieve at least the portion of each of these documents that contains information concerning the document relevancy. This information is retrieved by the server 154 and transmitted to the requesting one of clients 158-162 which then compares the information to that in the user's reader preferences 106 which is typically stored on the requesting one of client 158-162. The requesting one of clients 158-162 then modifies the appearance of the document to indicate which, if any, of the hypertext contained within the original document are associated with documents that may be of interest to the user. In some embodiments, in order to speed delivery of content to the user, the document may be presented to the user before the hypertext documents are prefetched or partially prefetched and then after the relevant information about each hypertext has been received and compared to reader preferences, the original document's appearance may be modified to indicate which hypertext are most likely to provide the user with desirable content.

In the depicted example, distributed data processing system 150 is a private intranet, with network 152 representing an entity-wide (perhaps worldwide depending on the entity and implementation) collection of networks and gateways that use the TCP/IP suite of protocols to communicate with one another. At the heart of the private intranet is a backbone of high-speed data communication lines between major nodes or host computers consisting of tens, hundreds, thousands, or more of computer systems that route data and messages. Of course, distributed data processing system 150 also may be implemented as a number of different types of networks such as, for example, the Internet, an intranet, a wide area network, or a local area network.

FIG. 1B is intended as an example and not as an architectural limitation for the processes of the present invention.

Figure 2:
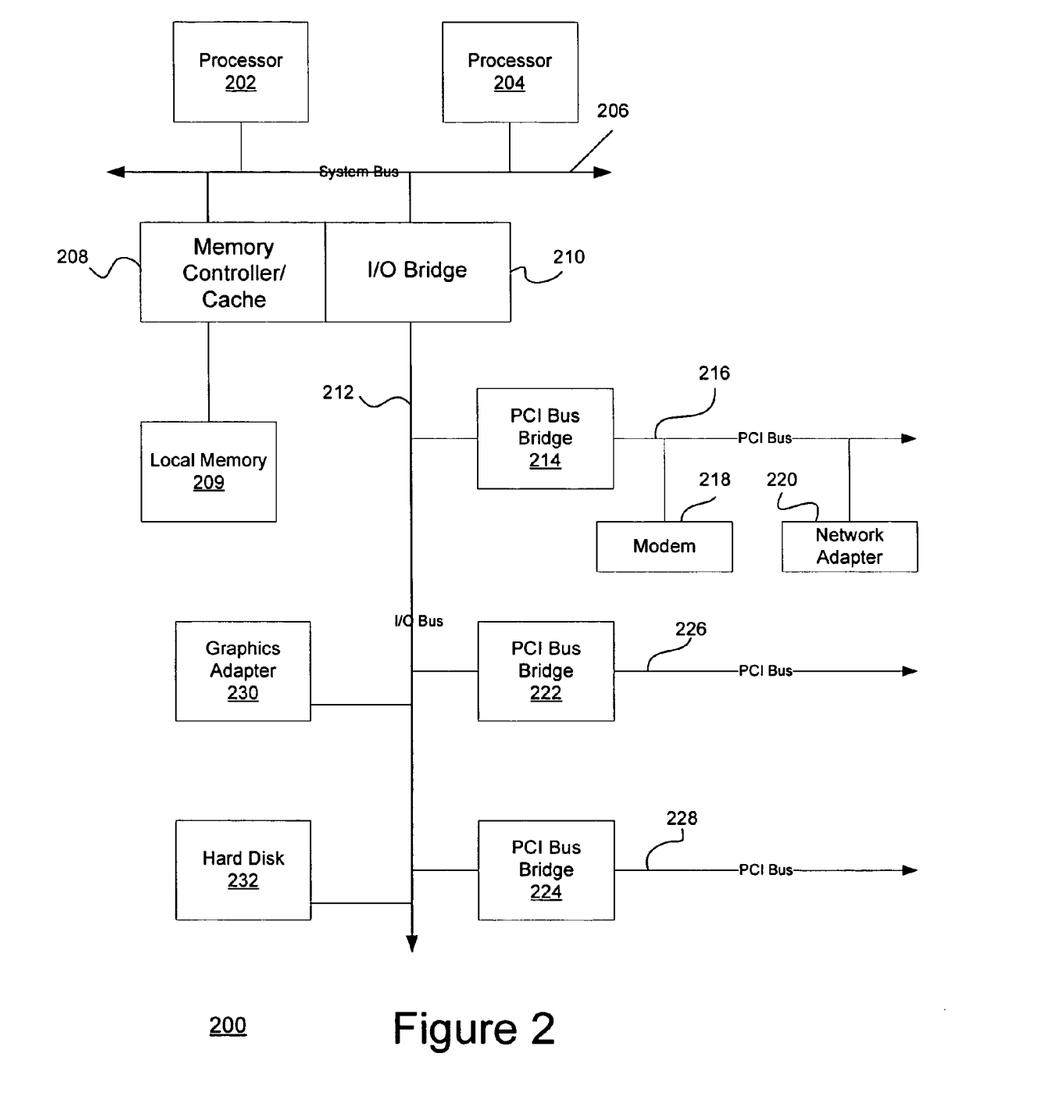
FIG. 2 depicts a block diagram of a data processing system which may be implemented as a server in accordance with the present invention.

Referring to FIG. 2, a block diagram of a data processing system which may be implemented as a server, such as server 154 or 156 in FIG. 1B, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 158-162 in FIG. 1B may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Data processing system 200 may be implemented as, for example, an AlphaServer GS1280 running a UNIX® operating system. AlphaServer GS1280 is a product of Hewlett-Packard Company of Palo Alto, Calif. "AlphaServer" is a trademark of Hewlett-Packard Company. "UNIX" is a registered trademark of The Open Group in the United States and other countries With reference now to FIG. 3, a block diagram of a data processing system in which the present invention may be implemented is illustrated. Data processing system 300 is an example of a client computer, such as, for example, any one of client computers 158-162 depicted in FIG. 1B. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

Figure 3:
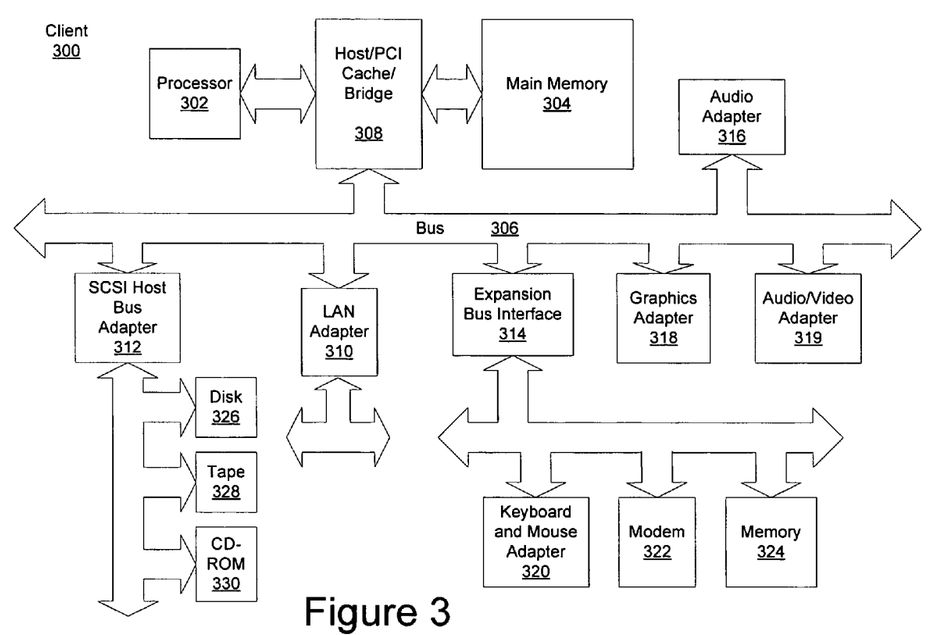
FIG. 3 depicts a block diagram of a data processing system in which the present invention may be implemented.

An operating system runs on processor 302 and is used to coordinate and provide control of various components within data processing system 300 in FIG. 3. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

A web browser or other hypertext viewing system runs on the operating system. This hypertext viewing system allows the user to make reader preference selections and prefetches all or part of documents associated with hypertext in documents retrieved from the network and modifies the appearance in accordance with reader preferences to indicate to a user which hypertext is most likely to return a document containing information of interest to the user.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
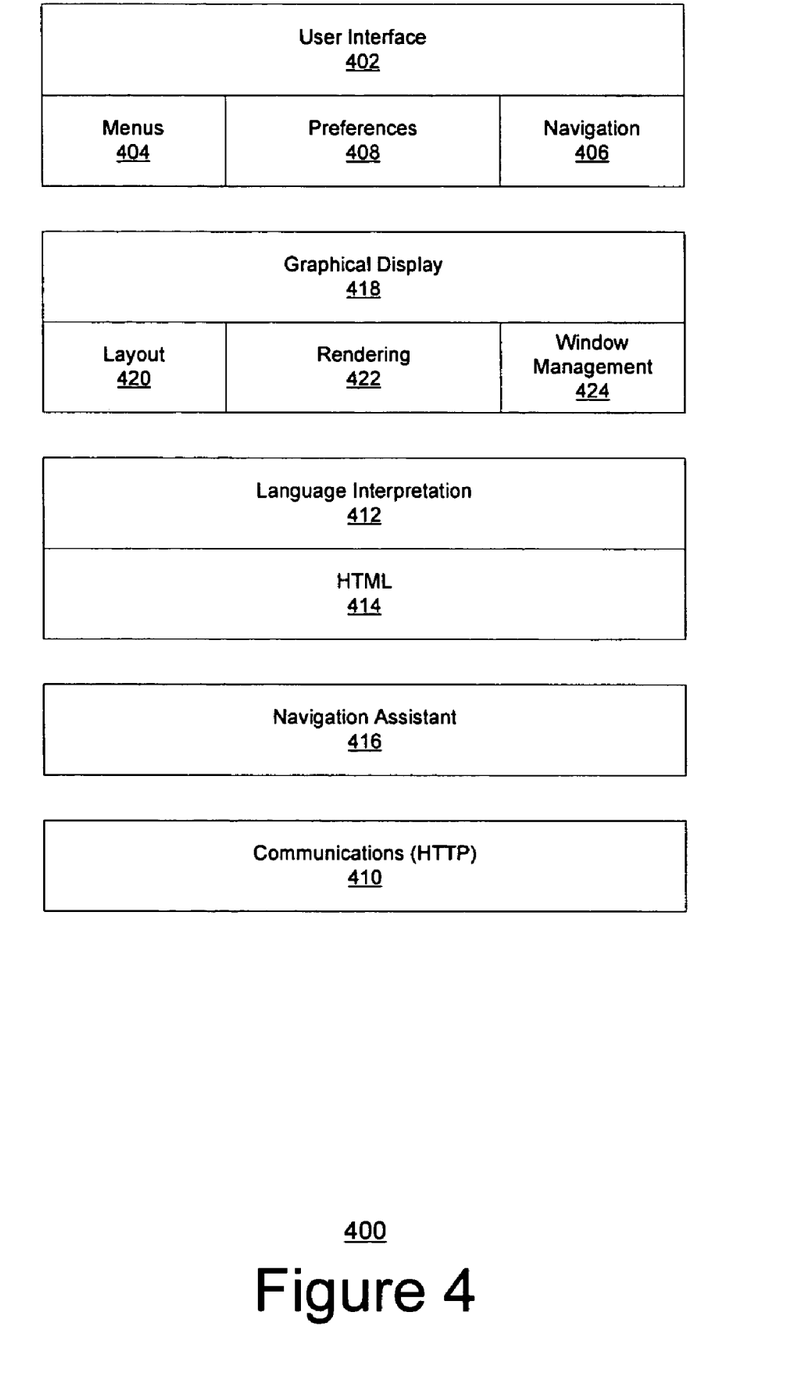
FIG. 4 depicts a block diagram of a browser program in accordance with one embodiment of the present invention.

Turning next to FIG. 4, a block diagram of a browser program is depicted in accordance with one embodiment of the present invention. Browser 400 may be implemented as, for example, a web browser on data processing system 300 depicted in FIG. 3 and as hypertext viewer 104 and reader preferences 106 depicted in FIG. 1A. Browser 400 includes a user interface 402, which is a graphical user interface (GUI) that allows the user to interface or communicate with browser 400. This interface provides for selection of various functions through menus 404 and allows for navigation through the navigation button 406 or selections. For example, menu 404 may allow a user to perform various functions, such as saving a file, opening a new window, displaying a history, and entering a URL. Navigation 406 allows for a user to navigate various pages and to select web sites for viewing. For example, navigation 406 may allow a user to see a previous page or a subsequent page relative to the present page. Preferences may be set through preferences 408. Preferences in preferences 408 may include reader preferences indicating the desired type of content and audience for which the user desired to have the hypertext modified to so indicate, thereby facilitating more efficient browsing of documents in a network. The preferences in preferences 408 may also indicate the manner in which the user desires the document to be modified in order to indicate which hypertext links to documents that are more probably of interest to the user.

Communications 410 is the mechanism with which browser 400 receives documents and other resources from a network such as the Internet. Further, communications 410 is used to send or upload documents and resources onto a network. Navigation Assistant 416 intercepts and parses documents after communications 410 receives documents, but prior to processing by language interpretation 412. In the depicted example, communication 410 uses Hypertext Transfer Protocol (HTTP). However, other protocols are possible, such as, for example, Hypertext Transfer Protocol Secure (HTTPS). HTTPS is the protocol for accessing a secure Web server. Using HTTPS in the Universal Resource Locator (URL) instead of HTTP directs the message to a secure port number rather than the default Web port number of 80. The session is then managed by a security protocol.

Documents that are received by browser 400 are processed by language interpretation 412, which includes an HTML/XML unit 414. Language interpretation 412 will process a document for presentation on graphical display 418. In particular, Hypertext Markup Language (HTML) and Extensible Markup Language (XML) statements are processed by HTML/XML unit 414 for presentation. As will be obvious to those skilled in the art, languages other than HTML and XML may also be utilized.

Graphical display 418 includes layout unit 420, rendering unit 422, and window management 424. These units are involved in presenting web pages to a user based on results from language interpretation 412. These units are also involved in determining the appearance of web pages or documents based on the information received from prefetched web pages or documents associated with hypertext in a current document and on how this information matches the reader preferences stored in preferences 408.

In the present example, navigation assistant 416 is depicted as a "plug-in" module to browser 400. Plug-in refers to a file containing data or application software used to alter, enhance, or extend the operation of a parent application program. For example, the Netscape Navigator World-Wide Web browser supports plug-ins. However, although the "plug-in" module is the preferred embodiment, navigation assistant 416 could be incorporated into browser 400 as a direct modification of code. Furthermore, navigation assistant 416 could be utilized on a proxy server wherein navigation assistant 416 pre-filters web pages on a web server prior to receipt by browser 400.

Browser 400 is presented as an example of a browser program in which the present invention may be embodied.

Browser 400 is not meant to imply architectural limitations to the present invention. Presently available browsers may include additional functions not shown or may omit functions shown in browser 400. As used herein, the term "browser" encompasses any software application used to view or navigate for information or data (e.g., something that assist a user to browser) in a distributed data base where the distributed database is typically an internet or the Internet (also sometimes referred to as the World Wide Web).

Figure 5:
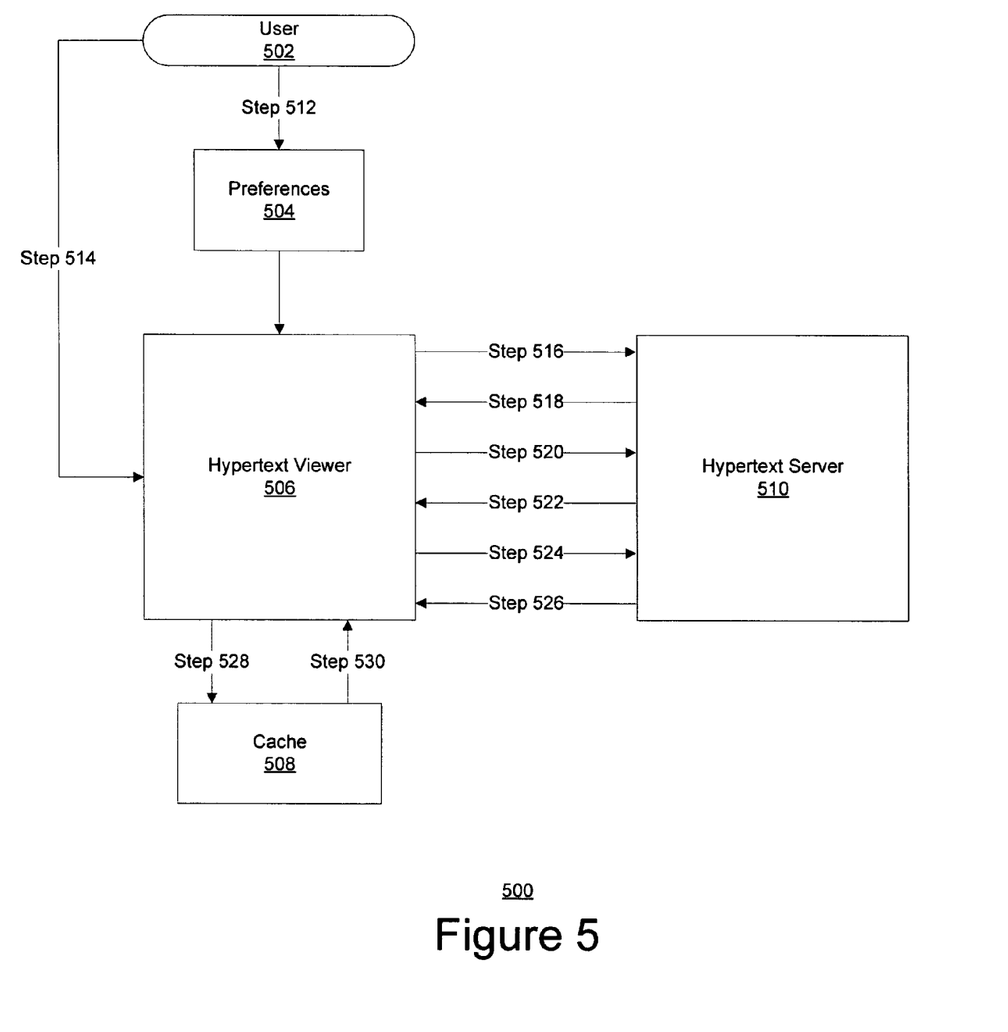
FIG. 5 depicts a block diagram illustrating an exemplary procedure for modifying hypertext to aid a user in retrieving documents of interest to the user in accordance with one embodiment of the present invention.

With reference now to FIG. 5, a block diagram illustrating an exemplary procedure for modifying hypertext to aid a user in retrieving documents of interest to the user is depicted in accordance with one embodiment of the present invention. To being, a user 502 updates a job role (or other criteria indicating user interest), domains, and read-ahead preferences (step 512) and stores these reader preferences in preferences 504. The domains are the domains for which the user desires the navigation aid to be applied to. Documents from all other domains will not utilize the advantages of the present invention. Typically, the domains specified by the user will be those for which the user is fairly confident that the documents have been encoded with the information necessary to modify the appearance such that the user is informed as to which hypertext contains links to documents that are probably of interest to the user. Presumably, other domains contain documents not so encoded, thus, the user is instructing the system not to waste time prefetching documents for which the user knows at least to a high probability are not properly encoded to make user of the present invention. Read ahead may be a number or other indication specifying the requirements that must be met before a hypertext is presented as hypertext that links to a document of probably interest to the user.

The user 502 then requests a document containing hypertext using hypertext viewer 506 (step 514). The viewer 506 forwards the request to hypertext server 510 (step 516). The server 510 returns the hypertext containing document to viewer 506 (step 518). The viewer 506 parses the hypertext for links in the specified domain(s) and, if found, sends, for example, a "head" request to the server for the server 510 to return a header or other portion of the specified linked pages containing the information necessary to determine if the document is of probable interest to the user (step 520).

The server 510 returns the "head" of the document containing the appropriate information about the document necessary to determine the relevance of the document to the user back to viewer 506 (step 522). The viewer 506 then determines the target audience or other relevancy information and hyperlinks are modified (e.g., color-coded) based on the relevance to the user 502. For example, if the hyperlinks are color-coded, the user learns that, for example, the darker blue links are considered more relevant than light blue ones; and that gray links, although accessible, are not deemed relevant to the user or to the user's job role. Alternatively, the color-codes or other modifications may be specified by the user rather than imposed by the system.

If read-ahead is enabled and the document is targeted to the user's 502 role or interest, the viewer 506 sends a "get" request to the server 510 to fetch the entire page thereby making that page more quickly available to the user 502 if the user 502 selects that particular hyperlink (step 524). The server 510 then returns the "prefetched" document to the viewer 506 (step 526). The viewer 506 then stores the document in a read-ahead cache 508 for later viewing (step 528) and retrieves the document and displays the document to the user 502 when the user 502 selects the corresponding hyperlink in the original document (step 530).

Figure 6:
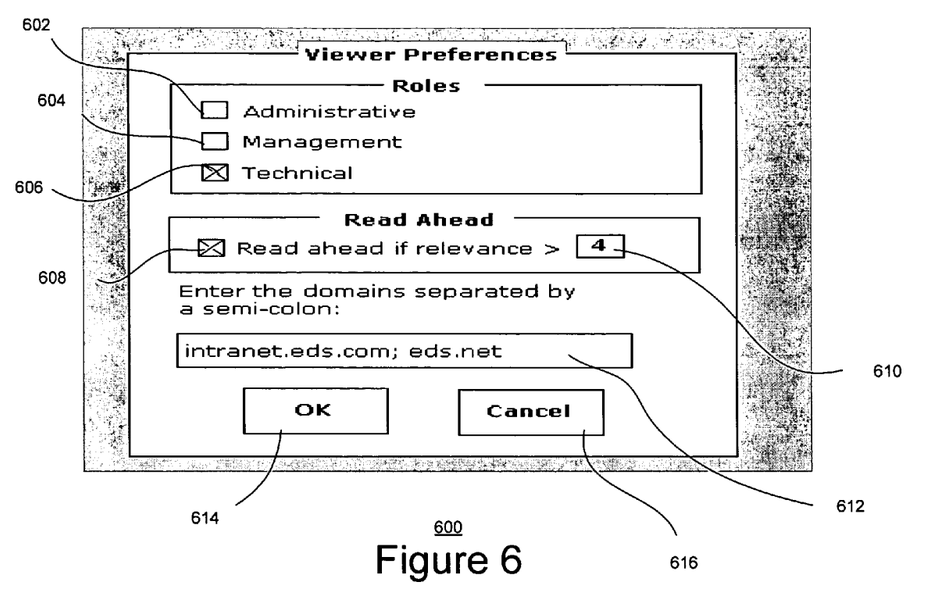
FIG. 6 depicts an exemplary a viewer preferences dialog box 600 for allowing a user to select reader preferences in accordance with one embodiment of the present invention.

With reference now to FIG. 6, an exemplary a viewer preferences dialog box 600 for allowing a user to select reader preferences is depicted in accordance with one embodiment of the present invention. Dialog box 600 is an example of a dialog box that may be presented to a user in an environment in which the hypertext guiding system is implemented within an enterprise to aid workers to locate information relevant to the worker's role within the enterprise. Dialog box contains a role selection area containing three options: administrative 602, management 604, and technical 606. The dialog box also contains a read ahead relevance section containing a check box 608 which a user may select to indicate that the system should prefetch documents associated with links that satisfy a relevance of greater than a number specified in relevance entry area 610. In the depicted example, the read ahead relevance check box 608 has been selected and the relevance entry area 610 has had the value of "4" entered in it. The dialog box 600 also contains a domain entry area 612 in which the user can specify the identity of domains for which the hypertext guide system of the present invention is to be implemented. In the depicted example, the user has indicated that the domains for which to utilize the present invention are "intranet.eds.com" and "eds.net". The dialog box 600 also contains an "OK" button which, if selected, stores the entered information in the user's reader preferences, and a "cancel" button allowing the user to cancel the entry of the data into reader preferences.

Dialog box 600 is presented merely as an example of a method of entering reader preferences. Those of ordinary skill in the art will recognize that there are numerous other methods for providing reader preferences to the system that may be utilized without departing from the scope and spirit of the present invention. The dialog box 600 also presents a box suitable for a role based guided hypertext system suitable for use in a workplace environment. However, the present invention is not limited to use in the workplace and is not limited to role based determination of interest for a user. The present invention may also be applied to topic or content based systems and systems not related to workplace or job function.

Figure 7:
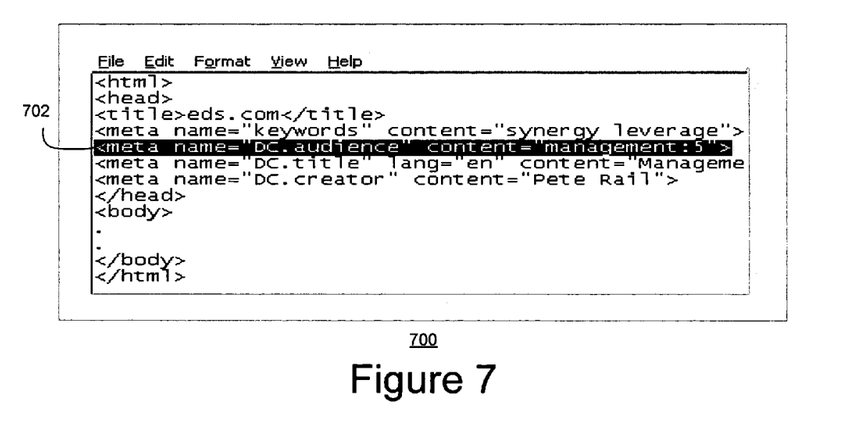
FIG. 7 depicts an exemplary document's metatag lines providing the information necessary for modifying hypertext and prefetching web pages in accordance with one embodiment of the present invention.

With reference now to FIG. 7, an exemplary document's metatag lines providing the information necessary for modifying hypertext and prefetching web pages is depicted in accordance with one embodiment of the present invention. Document 700 contains metatags as depicted in FIG. 7. Hypertext documents must be classified by audience, topic or some other classification system in order for the navigation assistant to function. This classification practice is often called "tagging" and is standard procedure for the Internet and any mature internet system. Examples of other metatags that may be utilized include creator, title, keywords, and description. The navigation assistant may be programmed to use any one or more of these or other classification systems in determining which hypertext links are more relevant for a given user.

In the document 700 depicted in FIG. 7, line 702 contains the audience meta tag indicating that the content that follows is targeted at the "management" audience. The number "5" that follows the audience is a relevance score assigned to the content by the author. The navigation assistant may use, for example, a scale of 1-5 where 5 is most relevant. This indicates that this document is highly relevant to managers.

Note that in the depicted example, the navigation assistant utilizes the Dublin Core meta element DC.audience. The Dublin Core is a metadata element set intended to facilitate discovery of electronic resources. Originally conceived for author-generated description of Web resources, it has attracted the attention of formal resource description communities such as museums, libraries, government agencies, and commercial organization. However, the meta tag system utilized is unimportant as long as the navigation assistant system on the user's data processing system is aware of which system is being utilized and knows how to extract the appropriate information.

Although described primarily with reference to an enterprise's intranet, the navigation assistant may be implemented on the Internet or any other network system as well. Furthermore, the present invention is not limited to role based systems, but may be implemented as other systems, such as, for example, a topic, context, or content based system. Also, in other embodiments, the present invention may be utilized as a filtering system to filter out inappropriate content. For example, if the user is a child, domains may be created that force, for example, contractually, all documents created and posted on the domain to adhere to a format in which a header indicating the content of the document and the intended audience is encoded within the document. Thus, parents could restrict their child's viewing to web pages from within this domain and the reader preferences selected such that, for example, documents that are tagged as "adult content" are prohibited from being displayed to the user. Those skilled in the art will recognize many other uses for the present invention besides those illustrated herein.

It should be noted that although described primarily with reference to visual manipulations of the document, other types of hyperlink annotations may be utilized as well. For example, audible tones of differing pitch corresponding to different hyperlinks could indicate which links to follow. Furthermore, if the hypertext viewer includes a text to speech synthesizer, the document may be manipulated such to insert additional words to be spoken by the speech synthesizer to indicate which hypertext links may represent more useful information for the user. Any number of other variations and combinations of visual as well as audible indicia of the relevancy of a hyperlink may be included as well.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for aiding a user in navigating documents containing hyperlinks, the method comprising:
    storing reader preferences relating to information contained in the headers of secondary documents;
    including an audience category in the reader preferences, whereby the user may obtain a modified hyperlink indication of relevance to reader preferences by secondary document author;
    including an identification of a domain in the reader preferences, whereby the user may obtain a modified hyperlink indicating a secondary document from a predetermined source that the user expects to be useful;
    retrieving a document from a network location;
    parsing the document for hyperlinks associated with secondary documents;
    responsive to detecting a hyperlink, sending a request for the header of the secondary document associated with the hyperlink, wherein the header contains information corresponding to characteristics of the secondary document;
    receiving only the secondary document header from a hypertext server responding to the request;
    comparing the information within the header of the secondary document to the stored reader preferences; and
    modifying the presentation of the hyperlink to the user based on results of the comparison of the information contained within the header with the stored reader preferences.

2. The method as recited in claim 1, further comprising: responsive to the comparison of the information to the stored reader preferences, prefetching the secondary document and storing the secondary document in a read ahead cache.

3. The method as recited in claim 2, further comprising: responsive to user selection of the hyperlink associated with the secondary document, retrieving the secondary document from the read ahead cache and presenting the secondary document to the user.

4. The method as recited in claim 1, wherein the hyperlinks are color coded to indicate the results of the comparison for the information to the reader preferences wherein varying colors are utilized to represent varying results.

5. The method as recited in claim 1, wherein the modification of the hyperlinks comprises presenting a graphic proximate to the hyperlink.

6. The method as recited in claim 5, wherein the graphic is an icon.

7. The method as recited in claim 1, wherein the information is encoded in meta tags.

8. A computer program product in a computer readable storage media for use in a data processing system for aiding a user in navigating documents containing hyperlinks, the computer program product comprising:
    first instructions for storing reader preferences relating to information contained in the headers of secondary documents;
    second instructions for including an audience category in the reader preferences, whereby the user may obtain a modified hyperlink indication of relevance to reader preferences by secondary document author;
    third instructions for including an identification of a domain in the reader preferences, whereby the user may obtain a modified hyperlink indicating a secondary document from a predetermined source that the user expects to be useful;
    fourth instructions for retrieving a document from a network location;
    fifth instructions for parsing the document for hyperlinks associated with secondary documents;
    sixth instructions, responsive to detecting a hyperlink, for sending a request to a server for the header of the secondary document associated with the hyperlink, wherein the header contains information corresponding to characteristics of the secondary document;
    seventh instructions for receiving only the secondary document header from a hypertext server responding to the request;
    eighth instructions for comparing the information within the header of the secondary document to the stored reader preferences; and
    ninth instructions for modifying the hyperlink based on results of the comparison of the information contained within the header with the stored reader preferences.

9. The computer program product as recited in claim 8, further comprising: eighth instructions, responsive to the comparison of the information to the reader preferences, for prefetching the secondary document and storing the secondary document in a read ahead cache.

10. The computer program product as recited in claim 9, further comprising: ninth instructions, responsive to user selection of the hyperlink associated with the secondary document, for retrieving the secondary document from the read ahead cache and presenting the secondary document to the user.

11. The computer program product as recited in claim 8, wherein the hyperlinks are color coded to indicate the results of the comparison for the information to the reader preferences wherein varying colors are utilized to represent varying results.

12. The computer program product as recited in claim 8, wherein the modification of the hyperlinks comprises presenting a graphic proximate to the hyperlink.

13. The computer program product as recited in claim 12, wherein the graphic is an icon.

14. The computer program product as recited in claim 8, wherein the information is encoded in meta tags.

15. A system for aiding a user in navigating documents containing hyperlinks, the system comprising:
   a plurality processors;
   first means for storing reader preferences relating to information contained in the headers of secondary documents;
   second means for including an audience category in the reader preferences, whereby the user may obtain a modified hyperlink indication of relevance to reader preferences by secondary document author;
   third means for including an identification of a domain in the reader preferences, whereby the user may obtain a modified hyperlink indicating a secondary document from a predetermined source that the user expects to be useful;
   fourth means for retrieving a document from a network location;
   fifth means for parsing the document for hyperlinks associated with secondary documents;
   sixth means for responsive to detecting a hyperlink, for sending a request to a server for the header of the secondary document associated with the hyperlink, wherein the header contains information sufficient corresponding to characteristics of the secondary document;
   seventh means for receiving only the secondary document header from a hypertext server responding to the request;
   eighth means for comparing the information within the header of the secondary document to the stored reader preferences; and
   ninth means for modifying the presentation of the hyperlink to the user based on results of the comparison of the information contained within the header with the stored reader preferences.

16. The system as recited in claim 15, fun her comprising: eighth means, responsive to the comparison of the information to the reader preferences, for prefetching the secondary document and storing the secondary document in a read ahead cache.

17. The system as recited in claim 16, farther comprising: ninth means, responsive to user selection of the hyperlink associated with the secondary document, for retrieving the secondary document from the read ahead cache and presenting the secondary document to the user.

18. The system as recited in claim 15, wherein the hyperlinks are color coded to indicate the results of the comparison for the information to the reader preferences wherein varying colors are utilized to represent varying results.

19. The system as recited in claim 15, wherein the modification of the hyperlinks comprises presenting a graphic proximate to the hyperlink.

20. The system as recited in claim 19, wherein the graphic is an icon.

21. The system as recited in claim 15, wherein the information is encoded in meta tags.

* * * * *

UNITED STATES PATENT AND TRADEMARK OFFICE
CERTIFICATE OF CORRECTION

PATENT NO. : 7,590,631 B2
APPLICATION NO. : 10/932941
DATED : September 15, 2009
INVENTOR(S) : Peter D. Rail

It is certified that error appears in the above-identified patent and that said Letters Patent is hereby corrected as shown below:

In column 14, line 9, in Claim 16, delete "fun her" and insert -- further --, therefor.

In column 14, line 14, in Claim 17, delete "farther" and insert -- further --, therefor.

Signed and Sealed this

Twelfth Day of October, 2010

David J. Kappos
*Director of the United States Patent and Trademark Office*